Aug. 27, 1963 J. E. GODFREY ET AL 3,101,952

TONE-ARM FOR A PLAY-BACK SOUND REPRODUCER

Filed Feb. 2, 1962 2 Sheets-Sheet 1

INVENTORS
JAMES E. GODFREY
EUGENE LESSERSON
BY [signature]
ATTORNEY.

Aug. 27, 1963 J. E. GODFREY ET AL 3,101,952

TONE-ARM FOR A PLAY-BACK SOUND REPRODUCER

Filed Feb. 2, 1962

2 Sheets-Sheet 2

INVENTORS
JAMES E. GODFREY
EUGENE LESSERSON
BY [signature]
ATTORNEY.

United States Patent Office 3,101,952

Patented Aug. 27, 1963

3,101,952

TONE-ARM FOR A PLAY-BACK SOUND REPRODUCER

James E. Godfrey, 150 Lincoln Ave., New Rochelle, N.Y., and Eugene Lesserson, 7 Fernwood St., Wethersfield, Conn.

Filed Feb. 2, 1962, Ser. No. 170,762
3 Claims. (Cl. 274—23)

The present invention relates to a tone-arm for a play-back sound reproducer.

It is well known, that master records are cut in such manner, that the cutting stylus moves radially in a straight line from the edge of the record towards its center. It is also well known, that conventional pick-up arms guide the play-back stylus along an arc of a circle. The movement of the conventional pick-up arms along an arc of a circle is caused by the particular supporting means of the conventional pick-up stylus, which is fixed at one end of a tone arm and the latter is pivotally mounted at its other end on a turn table mechanism. Since the tone arm is pivoted from a fixed point, it cannot follow the originally radially disposed cutting stylus movement, whereby a "tracking error" is created. The tracking error is the deviation from the tangential path of the stylus in the groove at the point of contact.

It has been recognized already that the friction created by the pressure of the stylus of conventional structure against the groove wall as it guides the stylus in its horizontal arcuate movement, causes substantial wear on the grooves of the record, thereby reducing the useful life of the record and the stylus as well. It is readily known that the tracking error reduces the quality of reproduction of the record, and the wear on the record grooves in turn reduces the usefulness of the record.

Upon recognizing this drawback, attempts have been made to eliminate the movement of the play-back stylus along an arc of a circle and to provide a substantially radial movement of the stylus from the edge of the record to the center thereof.

In accordance with this known structure a guide or carriage support rod secured to a pivot post is provided to support a carriage by means of bearing elements for longitudinal movement on the rod, which in turn carries a base or cartridge support arm, to one extremity of which is secured a cartridge, the carriage support, the cartridge support arm and the cartridge thus moving along the mentioned rod.

While this known structure brought about a substantially radial movement of the stylus on the record, the structure is of such complicated nature, that its manufacture is not sufficiently economical in order to permit a broader application in the particular field.

It is, therefore, one object of the present invention to provide a play-back sound reproducer in which the tone arm includes a reservoir adapted to receive a fluid in which a float is movable in longitudinal direction of the tone arm. The cartridge carrying the stylus is supported by the float and moves jointly with the float during its movement in longitudinal direction of the tone arm.

It is another object of the present invention to provide a play-back sound reproducer, in which the tone arm includes means for easily lifting and lowering, respectively, the stylus from its operative position into its inoperative position and vice versa.

With these and other objects in view, which will become apparent in the following detailed description, the present invention will be clearly understood in connection with the accompanying drawings, in which.

Figures 1, 2:
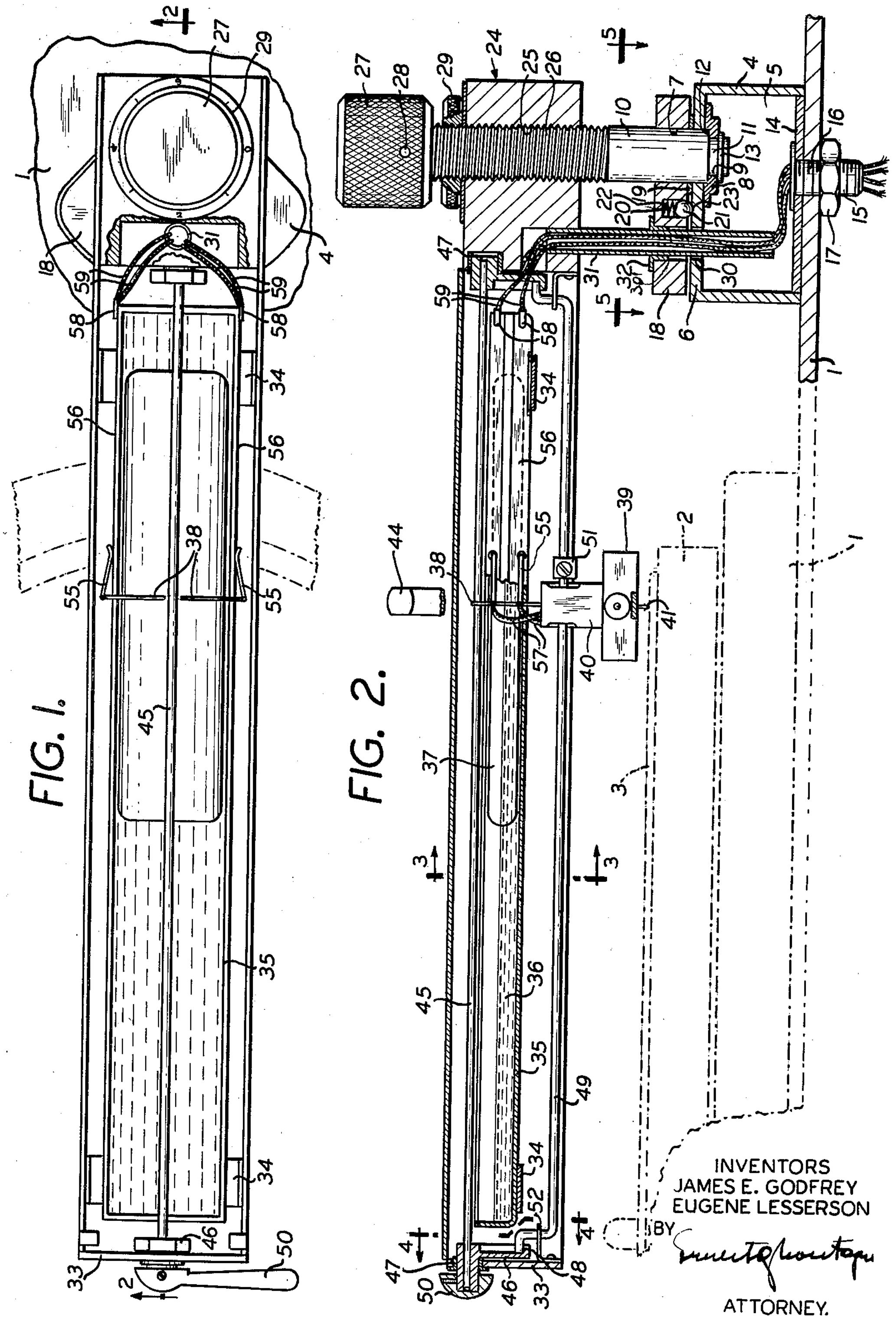
FIGURE 1 is a top plan view of the tone arm of a play-back sound reproducer.
FIG. 2 is a section along the lines 2—2 of FIG. 1.
Figure 3:
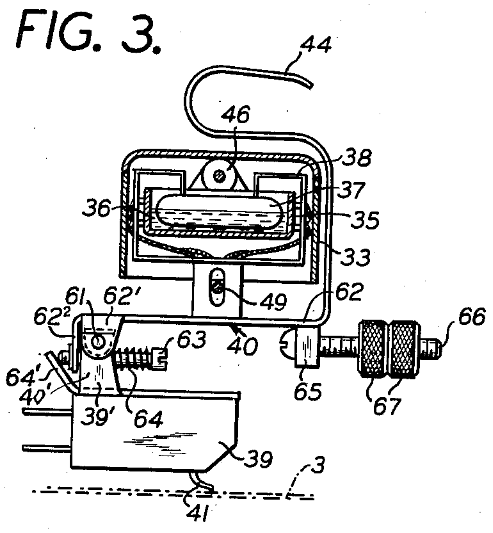
FIG. 3 is a section along the lines 3—3 of FIG. 2.

Referring now to the drawings, and in particular to FIGS. 1 to 5, which disclose a preferred form of the present invention, the play-back sound reproducer comprises a table 1, which has in conventional manner an electric motor (not shown) disposed therebeneath, and which table 1 supports a turn-table 2. The latter is provided, in conventional manner, with a felt or otherwise padded surface for supporting a conventional record 3 thereon.

A tone-arm base 4, adapted to be mounted on the table 1, defines a housing 5, the upper wall 6 of which has a bore 7 and is equipped with a downwardly extending cylindrical flange 8 defining at its bottom a cylindrical opening 9 of a diameter which is smaller than that of the bore 7. A height adjustment screw bolt 10 is inserted into the bore 7 of the tone-arm base 4, which height adjustment screw 10 terminates with a portion 11 of a smaller diameter than the remaining portion of the height adjustment screw bolt 10, the latter forming a shoulder which rests on the lower inwardly turned end of the flange 8 projecting downwardly into the housing 5 from the upper wall 6 of the tone-arm base 4. A retaining ring or snap ring 13 secures the height adjustment screw bolt 10 in the upper portion 6 of the housing 5 to permit a rotating movement therein.

The bottom wall 14 of the tone-arm base 4 is secured to the table 1 by means of a tubular bolt 15 carrying outer thread 16 and a nut 17 threadedly engaging the thread 16 of the tubular bolt 15 secures the tone-arm base 4 to the table 1.

The height adjustment screw bolt 10 projects additionally through a substantially sector shaped guide plate 18 which is turnably mounted on top of the tone-arm base 4 by means of a bearing, as a bronze bearing 19. A recess 20 disposed vertically terminates at the bottom face of the guide plate 18 and receives at its lower end a ball 21 which is pressed downwardly towards the top face of the tone-arm base 4 by a helical spring 22 engaging and pressing downwardly the ball 21. The top face of the tone-arm base 4 has two shallow recesses 23, adapted to receive the ball 21 in the operative and in the inoperative position, respectively, of the tone-arm.

A tone-arm 24 is secured to the height adjustment screw bolt 10 by means of a vertical threaded bore 25 which receives a threaded portion 26 of the height adjustment screw bolt 10 and is disposed exactly radially from the height adjustment screw bolt 10 towards the center of the turn-table 2, so that the stylus moves radially along the record in the manner as the cutting stylus. The latter has secured thereto at its top a knob 27 by means of a pin 28 or by any other conventional means. By this arrangement it is possible to turn the height adjustment screw bolt 10 which performs merely a rotating movement, yet is prevented from performing an axial movement, while the tone-arm 24 thereupon is moved upwardly or downwardly, and just performs a vertical movement parallel to itself depending upon the direction of rotation of the height adjustment screw bolt 10. A lock nut 29 is disposed between the knob 27 and the top face of the tone-arm 24 and threadedly engages the threaded portion 26 of the height adjustment screw bolt 10, in order to permit a locking of the latter at any predetermined position.

The upper wall 6 of the housing 5 has an additional shot 30 opposite the turn-table 2 and a vertically disposed stabilizing tube 31 disposed in preferably vertical arrangement in the slot 30 and performs a vertical sliding movement therein. The upper end of the stabilizing tube 31 is rigidly secured into a complementary opening of the tone-arm 24, which opening is provided in the bottom face thereof.

The guide plate 18 has an additional bore 30′ and a bushing 32 is received in the bore 30′ through which the stabilizing tube 31 extends. Upon turning the guide plate 18 about the bolt 10, the tube 31 moves in the slot 30 of the housing 5.

Figure 4:
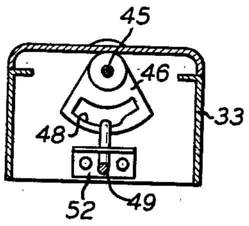
FIG. 4 is a section along the lines 4—4 of FIG. 2.
Figure 7:
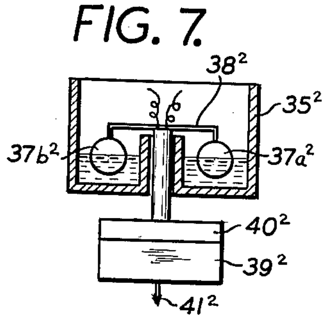
FIG. 7 is a section along the lines 7—7 of FIG. 6.

The tone-arm 24 comprises a body 33 which is equipped with preferably at least two cross-wise disposed supports 34 on which a reservoir 35 is immovably mounted. The reservoir 35 is adapted to receive a liquid 36, as for instance a suitable oil, and a float 37 is suspended in the liquid 36 within the reservoir 35. A carriage support 38 is mounted on the float 37 to be moved with the latter in longitudinal direction of the reservior 35. A carriage 40 is carried by the carriage support 38, which carriage 40 in turn carries a cartridge 39 having in conventional manner a stylus 41. The carriage 40 supports the upwardly extending carriage transverse arm 44 which is adapted to move, if necessary, manually the cartridge 39 with the carriage 40 and the stylus 41 into its rearmost position jointly with the float 37 in the reservoir 35. A connecting rod 45 extends between the end walls of the body 33 and the ends of the connecting rod 45, which is disposed within the body 33 preferably above the reservoir 35, are received by a pick-up cam 46 which is rotatably mounted in the end walls of the body 33 by means of bushings 47 inserted into corresponding openings provided in the body 33. The pick-up cams 46 have at their bottom a cam face 48, clearly shown in FIG. 4 of the drawings, which supports a pick-up cam rod 49, the ends of which are cranked upwardly to rest on the cam face 48 and which pick-up cam rod 49 extends through the carriage 40. A cam lever 50 is secured to the pick-up cam 46 to rotate therewith. As shown in FIG. 4 of the drawings, the ends of the pick-up cam rod engage the cam face 48 in the lower operative position and upon turning the pick-up cam 46 clockwise by means of the cam lever 50, the ends of the pick-up cam rod 49 and, thereby, also the carriage 40 with the stylus 41 are lifted into inoperative position, performing a substantially vertical movement for lifting the stylus as well as for lowering the stylus, whereby a scratching of the grooves in the record is clearly avoided.

Due to the fact that the pick-up cam rod 49 projects through the carriage 40, the lifting and lowering of the latter is brought about by operation of the pick-up cam 46.

The pick-up cam rod 49 is equipped with a stop member 51 which is adjustably mounted thereon in order to locate the starting position for the reproduction of the record 3. Furthermore, a stabilizing bracket 52 is provided at the lower portions of the end walls of the body 33 in order to confine the lifting movement of the rod 49 to a vertical direction.

The carriage 40 is also equipped with a frame 62 which has two downwardly extending projections 62′ receiving cross-wise a pivot 61. The frame 62 has additionally at one end a downwardly bent ledge $62^2$ which receives threadedly a screw bolt 63 and has mounted thereon a helical spring 64 which prevents any loosening of the screw bolt 63 from the ledge $62^2$ after setting. The lower portion 40′ of the carriage 40 has in turn two upwardly directly and oppositely disposed extensions 39′ which receive likewise the pivot 61, so that the cartridge 39 carried by the portion 40′ is pivotally connected with the frame 62. An inclined projection 64′ extending from the end of the lower portion 40′ of the carriage 40 is adapted to be engaged by one end of the screw bolt 63, so that upon adjusting of the screw bolt 63, the pressure of the stylus 41 on the record can be controlled by a movement of the cartridge 39 about the pivot 61.

The frame 62 has secured thereto, by welding or the like, a block 65 which receives a second screw bolt 66 threadedly carrying preferably two nuts 67. The screw bolt 66 projects laterally from the frame 62, and upon moving the nuts 67 along screw bolt 66, a proper balance with the mass of the cartridge 39 can be brought about, which balancing is required since the cartridge 39 is substantially disposed towards one side of the vertical center line of the carriage support 38.

In order to provide the necessary electric connection from the stylus 41 to the amplifier (not shown), the carriage support 38 is equipped with brushes 55 which engage resiliently the outer faces 56 of the reservoir 35, which preferably may be equipped with a printed conducting layer. Wires 57 lead to the brushes 55 and terminals 58 are secured to the lateral faces of the reservoir 35 at the rear thereof to be connected with wires 59, which extend through the stabilizing tube 31 and through the hollow bolt 15.

Figure 5:
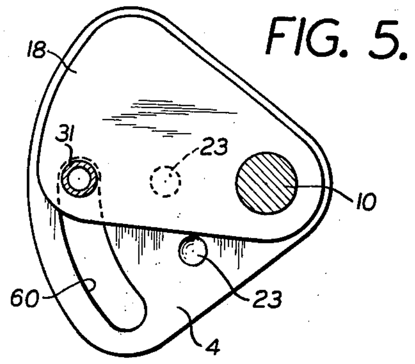
FIG. 5 is a section along the lines 5—5 of FIG. 2.

In order to permit the tone-arm to be turned for 45° out of the range of the turn-table 2, the bore 30 in the upper wall 6 of the housing 5 is preferably formed as a slot 60 extending concentrically about the longitudinal axis of the height adjustment screw bolt 10 for about 45°, as clearly shown in FIG. 5 of the drawings.

Figure 6:
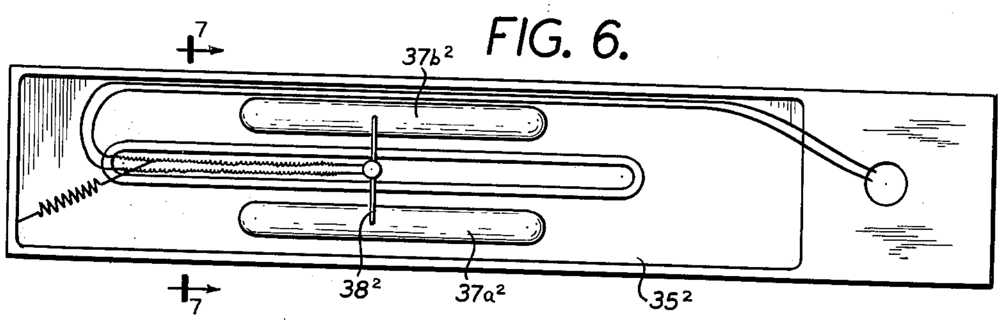
FIG. 6 is a top plan view of a second embodiment of the tone arm having a reservoir with two parallel chambers, each of the chambers being equipped with a float.

Referring now again to the drawings, and in particular to FIG. 6, a second embodiment of the tone-arm is disclosed therein, where the reservoir $35^2$ is divided at least for a part of its length into two parallelly disposed compartments, each of which is equipped with a float $37a^2$ and $37b^2$. The carriage support $38^2$ is in this case carried by both floats $37a^2$ and $37b^2$ and provides therefor a better balancing of the support for the carriage $40^2$, the cartridge $39^2$, and thereby, also for the stylus $41^2$.

While we have disclosed several embodiments of the present invention, it is to be understood that these embodiments are given by example only and not in a limiting sense, the scope of the present invention being determined by the objects and the claims.

We claim:

1. In a tone-arm for a play-back sound reproducer,
   a pick-up tone-arm having a pick-up stylus adapted to be supported above a record carried by a turn-table,
   said tone-arm comprising a reservoir supported by carrier means,
   said reservoir receiving a liquid,
   at least one float disposed in said reservoir and suspended in said liquid for substantially radial movement towards the center of said turn-table,
   a carriage supported by said float for free movement with said float,
   said stylus being carried by said carriage, and
   means for selectively moving said stylus between a lowered operative position and a raised inoperative position.

2. The tone-arm for a play-back sound reproducer, as set forth in claim 1, wherein
   said reservoir is divided for at least a part of its length into at least two compartments, and
   each of said compartments receiving said float, and
   said carriage is supported by all of said floats, in order to provide a balanced support for said stylus.

3. The tone-arm for a play-back sound reproducer, as set forth in claim 1, wherein
   said tone-arm includes a hollow body,
   said carrier means comprises cross members secured to said hollow body to support said reservoir,
   said hollow body has opposite end walls, and
   said means for selectively moving said stylus comprising a pick-up cam having a cam face and turnably mounted in each of said end walls, a connecting rod connecting said pick-up cam for joint rotating movement, and a pick-up cam rod extending longitudinally through said carriage and between and supported by said cam faces, so that upon rotation of said pick-up cams said pick-up cam rod is moved vertically due to its displacement on said cam faces.

References Cited in the file of this patent

UNITED STATES PATENTS

| | | |
|---|---|---|
| 978,090 | Wellenkamp | Dec. 6, 1910 |
| 2,378,412 | Lee | June 19, 1945 |
| 2,413,206 | Worsham | Dec. 24, 1946 |
| 2,532,293 | Weese | Dec. 5, 1950 |
| 2,676,806 | Bachman | Apr. 27, 1954 |